United States Patent Office 3,052,660
Patented Sept. 4, 1962

3,052,660
POLYMERIZATION OF OLEFINS WITH CATALYSTS OF METAL ALKYLS AND CYCLOPENTADIENYL VANADIUM OXYDIHALIDES
Maseh Osgan, Pittsburgh, Pa., assignor to Hercules Powder Company, Wilmington, Del., a corporation of Delaware
No Drawing. Filed Apr. 27, 1960, Ser. No. 24,884
10 Claims. (Cl. 260—88.2)

This invention relates to an improved process for polymerizing α-olefins whereby it is possible to carry out the polymerization under mild conditions of temperature and pressure.

In Belgian Patents Nos. 533,362, 534,792 and 534,888 of K. Ziegler et al., there is described a new process of polymerizing ethylene to a high molecular weight polyethylene under relatively mild conditions of temperature and pressure by using as the catalyst for the polymerization a mixture of a compound of a metal of groups IV–B, V–B, VI–B or VIII of the periodic table, or manganese, in combination with an organometallic compound of an alkali metal, alkaline earth metal, zinc, earth metal (especially aluminum), or rare earth metal.

More recently it has been disclosed in U.S. 2,924,594 that a bis(cyclopentadienyl)vanadium salt can be used in combination with a metal alkyl compound of a metal of groups I–A, II–A or III–A of the periodic table as a catalyst for the polymerization of ethylene.

It has now been discovered that a catalyst prepared from a compound of vanadium having but one cyclopentadienyl ring, more specifically, a cyclopentadienyl vanadium oxydihalide, can be used in combination with an alkyl metal compound of a metal of groups I–A, II–A, or III–A of the periodic table (see Lange's Handbook of Chemisty, 8th edition, pages 56–57, 1952), to produce a new and efficient catalyst for the polymerization, including copolymerization, of α-olefins.

Accordingly, the present invention relates to a process of polymerizing α-olefins which comprises contacting at least one α-olefin with a catalyst formed by mixing a cyclopentadienyl vanadium oxydihalide wherein the cyclopentadienyl moiety is selected from the group consisting of cyclopentadienyl and alkyl cyclopentadienyl radicals, with an alkyl metal compound of a metal selected from the group consisting of the metals of groups I–A, II–A, and III–A of the periodic table.

Before discussing the invention in greater detail, the following examples are presented for purposes of illustration, parts and percentages being by weight unless otherwise specified. The molecular weight of the polymers in the examples is indicated by the reduced specific viscosity given therein. By the term "reduced specific viscosity" (RSV) is meant the specific viscosity divided by the concentration of the solution in grams per 100 ml. measured at 135° C. on a solution in decahydronaphthalene containing 0.1 gram of the polymer in 100 ml. of the solution.

Example 1

A polymerization vessel was evacuated and flushed with nitrogen and then 43.3 parts of toluene (one fifth the volume of the vessel) was added. The vessel was closed and the nitrogen was withdrawn by vacuum, ethylene was admitted to a pressure of 15 p.s.i.g. The catalyst was formed in situ by adding 0.02 part of cyclopentadienyl vanadium oxydichloride and 0.072 part of trimethylaluminum. The vessel was maintained at a temperature of 30° C. In 15 minutes the pressure dropped to 0 p.s.i.g. The vessel was opened and 50 parts of ethanol added. Solid polyethylene was then separated by filtration and refluxed for 15 minutes with a 10% solution of hydrochloric acid in methanol. It was separated, washed with methanol and dried in a vacuum oven at 80° C. for 4 hours. The polyethylene thus isolated had an RSV of 1.1 and amounted to 0.46 part.

Example 2

A polymerization was conducted as described in Example 1 using 43.3 parts of toluene, 0.02 part of cyclopentadienyl vanadium oxydichloride and 0.127 part of ethylaluminum dichloride. The ethylene pressure dropped from the starting 15 p.s.i.g. to 0 p.s.i.g. in 2 minutes. Solid polyethylene was isolated as described in Example 1. The isolated polymer amounted to 0.57 part and had an RSV of 2.1. No unsaturated groups were detectable by infrared analysis.

Example 3

A polymerization was conducted as described in Example 1 using 43.3 parts of toluene, 0.00001 part cyclopentadienyl vanadium oxydichloride and 0.028 part methylaluminum dichloride. The ethylene pressure dropped from the starting 15 p.s.i.g. to 0 p.s.i.g. in 8 minutes. Solid polyethylene was isolated as described in Example 1. The isolated polymer had an RSV of 1.9 and amounted to 0.61 part.

Example 4

A polymerization was conducted as described in Example 1 using 34.2 parts of heptane, 0.000061 part of cyclopentadienyl vanadium oxydichloride and 0.011 part of methylaluminum dichloride. The ethylene pressure dropped to 0 p.s.i.g. in 25 minutes. Solid polyethylene was isolated as described in Example 1 and amounted to 0.49 part having an RSV of 13.7.

Example 5

A polymerization vessel was evacuated and flushed with nitrogen and then 110.6 parts of chlorobenzene (two fifths the volume of the vessel) was added. After the nitrogen was withdrawn by vaccum, propylene was admitted to a pressure of 45 p.s.i.g. and this pressure was maintained throughout the polymerization. The catalyst was formed in situ by adding 0.20 part of cyclopentadienyl vanadium oxydichloride and 0.36 part of diethylaluminum chloride. After 45 minutes at room temperature, the polymerization was quenched by adding 4.0 parts of n-butanol. An insoluble, stereoregular polypropylene fraction amounting to 0.08 part was recovered from the reaction mixture by filtration. After washing the filtrate with aqueous potassium carbonate, water, aqueous hydrochloric acid and then water until neutral, a soluble, amorphous polypropylene fraction was recovered by precipitation with a 5-fold volume of ethanol. Each polymer was dried under vacuum for 15 hours at 45° C. The stereoregular polypropylene had an RSV of 4.9 while the amorphous polypropylene had an RSV of 1.4.

The polymerization of propylene was conducted exactly as described above for 20 hous instead of 45 minutes. The yield of stereoregular polypropylene amounted to 0.38 part having an RSV of 9.7, and the yield of amorphous polypropylene amounted to 3.55 parts having an RSV of 2.1.

Example 6

A polymerization vessel was evacuated and flushed with nitrogen and then 110.6 parts of chlorobenzene (two fifths the volume of the vessel) was added. After the nitrogen was withdrawn by vacuum, a mixture of ethylene and propylene containing 60 mole percent propylene was admitted to a pressure of 25 p.s.i.g. and this pressure and a temperature of 30° C. maintained throughout the ensuing copolymerization. The catalyst was formed in situ by adding 0.012 part cyclopentadienyl vanadium oxydichloride and 0.072 part diethylaluminum chloride. During the copolymerization the propylene content of the input gas was reduced to 50 mole percent. After 80 minutes copolymerization was quenched by adding 4 parts of n-butanol and the copolymerization mixture was then diluted with 80 parts of heptane. The mixture was then washed with 10% aqueous hydrochloric acid, the organic layer was separated and successively washed with water until the aqueous phase was neutral. The organic diluents were then removed by evaporation. The ethylene-propylene copolymer that remained amounted to 2.0 parts and had an RSV of 2.0. Infrared analysis showed that the copolymer contained 26 mole percent of propylene.

*Example 7*

A copolymerization was conducted as described in Example 6 using 221.2 parts of chlorobenzene (four fifths the volume of the vessel), 0.128 part diethylaluminum chloride and 0.010 part of cyclopentadienyl vanadium oxydichloride. The ethylene-propylene mixture used to pressure the polymerization vessel had a propylene content of 80 mole percent. Input gas used during the 12 minutes of copolymerization contained 30 mole percent propylene. The ethylene-propylene copolymer product was isolated as described in Example 6. The isolated copolymer has an RSV of 1.3 and amounted to 0.88 part. Infrared analysis showed that the copolymer contained 41 mole percent propylene.

*Example 8*

A polymerization vessel was evacuated and flushed with nitrogen and then 43.3 parts of toluene (one fifth the volume of the vessel) was added. After the nitrogen was withdrawn by vacuum, ethylene was admitted to a pressure of 20 p.s.i.g. The catalyst was formed in situ by adding 0.01 part of cyclopentadienyl vanadium oxydichloride and 0.20 part of diethylberyllium. The reaction mixture was agitated overnight at 20° C., during which time the pressure decreased to a partial vacuum. A volume of ethanol equal to the volume of the reaction mixture was added. Insoluble polyethylene amounting to 0.0106 part was recovered from the reaction mixture by filtration.

$\alpha$-Olefins of any chain length can be polymerized in accordance with this invention to both homopolymers and copolymers of high molecular weight. Exemplary of the $\alpha$-olefins that can be polymerized singly or in admixture are ethylene, propylene, butene-1, 2-methyl-butene-1, pentene-1, 3-methyl-butene-1, etc.

The process of this invention is carried out by contacting an $\alpha$-olefin, usually in an inert liquid organic diluent, with a cyclopentadienyl vanadium oxydihalide and an alkyl metal compound of a group I–A, II–A or III–A metal.

Any cyclopentadienyl vanadium oxydihalide can be used in the process of this invention. The cyclopentadienyl moiety can be an alkyl-substituted cyclopentadienyl radical containing from 1–2 alkyl substituents. Exemplary cyclopentadienyl vanadium oxydihalides are: cyclopentadienyl vanadium oxydichloride, cyclopentadienyl vanadium oxydibromide, cyclopentadienyl vanadium oxydifluoride, methylcyclopentadienyl vanadium oxydichloride, dimethylcyclopentadienyl vanadium oxydichloride, ethylcyclopentadienyl vanadium oxydibromide, propylcyclopentadienyl vanadium oxydichloride, methylethylcyclopentadienyl vanadium oxydichloride, etc. The preparation of typical cyclopentadienyl vanadium oxydihalides is described by E. O. Fischer et al., Chem. Ber., 91, 1342 (1958).

The alkyl metal compound that is reacted with the cyclopentadienyl vanadium oxydihalide can be any alkyl compound of a metal of groups I–A, II–A or III–A of the periodic table, i.e., any alkali metal, alkaline earth metal or earth metal (especially aluminum). Exemplary of these metal alkyl compounds are: the alkali metal alkyls such as ethylpotassium, ethylrubidium, n-butyllithium, n-amylsodium, etc., alkaline earth metal alkyls such as dimethylmagnesium, diisopropylcalcium, diethylstrontium, diethylmagnesium, diethylberyllium, butylmagnesium chloride, ethylberyllium chloride, butylmagnesium bromide, etc., aluminum alkyls such as trimethylaluminum, triethylaluminum, tripropylaluminum, triisobutylaluminum, trioctylaluminum, ethylaluminum dichloride, methylaluminum dichloride, diethylaluminum chloride, dimethylaluminum chloride, diisobutylaluminum hydride, etc.

The reaction between the vanadium compound and the metal alkyl compound can be conveniently carried out by mixing the two compounds in an inert liquid organic diluent. In carrying out the reaction between the two compounds any concentration of the two reagents can be used that is convenient and the reaction can be carried out at any temperature, the latter generally being determined by the solvent being used. Usually the reaction is conveniently carried out at room temperature or at slightly elevated temperatures, but at a temperature of from about −50° C. to about 150° C. can be used. The molar ratio of the metal alkyl compound to the vanadium compound can be varied over a wide range and will depend largely upon the metal alkyl compound used. In general, the molar ratio of the metal alkyl compound to the vanadium compound will be from about 0.5:1 to 100:1 and more usually will be from about 1:1 to 10:1. The catalyst so obtained can be used immediately or it can be conveniently stored and used as desired. An alternate method of carrying out the reaction between the vanadium compound and the metal alkyl compound for the polymerization process is to add the olefin to a solution or mixture of the cyclopentadienyl vanadium oxydihalide and then add the metal alkyl compound as needed for the polymerization.

The polymerization process can be carried out in a wide variety of ways, as for example, either as a batch or continuous operation. As already pointed out, the catalyst combination can be preformed or it can be formed in situ, the latter being especially adapted for this polymerization process.

As stated above, the process of this invention preferably is carried out in an inert liquid organic diluent as, for example, an aliphatic hydrocarbon such as hexane, heptane, isooctane, etc., cycloaliphatic hydrocarbons such as cyclohexane, or aromatic hydrocarbons such as benzene, toluene, xylene, etc., halogenated aromatic hydrocarbons such as chlorobenzene, chloronaphthalene, etc., or any mixture of such inert diluents.

The selection of the temperature and pressure used for the polymerization process will depend upon many factors such as the degree of polymerization desired, etc. In general, the polymerization will be carried out at room temperature or slightly above, but any temperature within the range of from about −50° C. to about 150° C. and preferably from about 0° C. to about 100° C. can be used. In the same way, while atmospheric pressure or a pressure of only a few pounds can be used, the polymerization can be carried out over a wide range of pressures as, for example, from a partial vacuum to about 1,000 pounds and preferably from about atmospheric to about 500 pounds pressure. Higher pressures can, of course, be used but generally do not appreciably alter the course of the polymerization.

As shown by the above examples and discussion, the use of a catalyst formed by mixing a cyclopentadienyl vanadium oxydihalide with an alkyl metal compound of a group I–A, II–A or III–A metal in the polymerization of $\alpha$-olefins has many advantages over the prior art methods. The new catalyst of this invention is characterized by very high rates of polymerization so that the catalyst level can be very small in relation to the amount of catalyst required in many prior processes. For example, amounts in the range of 0.005 mmole to 0.1 mmole vanadium per liter of diluent are satisfactory. In addition the catalyst of this invention is soluble in the polymerization medium. Therefore, the catalyst residues can be easily removed from the polymer. In many cases, however, it is unnecessary to take special precautions to remove catalyst residues because the catalyst is normally used in such small amounts as to leave exceedingly small residues.

What I claim and desire to protect by Letters Patent is:

1. A process of polymerizing α-olefins which comprises contacting an α-olefin with a catalyst formed by mixing a cyclopentadienyl vanadium oxydihalide wherein the cyclopentadienyl moiety is selected from the group consisting of cyclopentadienyl and alkyl cyclopentadienyl radicals with an alkyl metal compound selected from the group consisting of the metal alkyls and metal alkyl halides of the metals of groups I–A, II–A and III–A of the periodic table in a molar ratio of alkyl metal compound to said vanadium compound of from about 0.5:1 to about 100:1.

2. The process of claim 1 in which the polymerization is the homopolymerization of ethylene.

3. The process of claim 1 in which the polymerization is the homopolymerization of propylene.

4. The process of claim 1 in which the polymerization is the copolymerization of ethylene and propylene.

5. The process of claim 1 in which the cyclopentadienyl vanadium oxydihalide is cyclopentadienyl vanadium oxydichloride.

6. The process of claim 1 in which the alkyl metal compound is trimethylaluminum.

7. The process of claim 1 in which the alkyl metal compound is ethylaluminum dichloride.

8. The process of claim 1 in which the alkyl metal compound is methylaluminum dichloride.

9. The process of claim 1 in which the alkyl metal compound is diethylaluminum chloride.

10. The process of claim 1 in which the alkyl metal compound is diethylberyllium.

References Cited in the file of this patent

UNITED STATES PATENTS

| 2,917,501 | Drucker | Dec. 15, 1959 |
| 2,924,594 | Breslow | Feb. 9, 1960 |

FOREIGN PATENTS

| 216,809 | Australia | Aug. 15, 1958 |

OTHER REFERENCES

Fischer et al.: Chem. Ber., vol. 91, pages 1342–44 (1958).